No. 728,993. PATENTED MAY 26, 1903.
E. SCOTT.
MONUMENT.
APPLICATION FILED JULY 28, 1902.
NO MODEL.
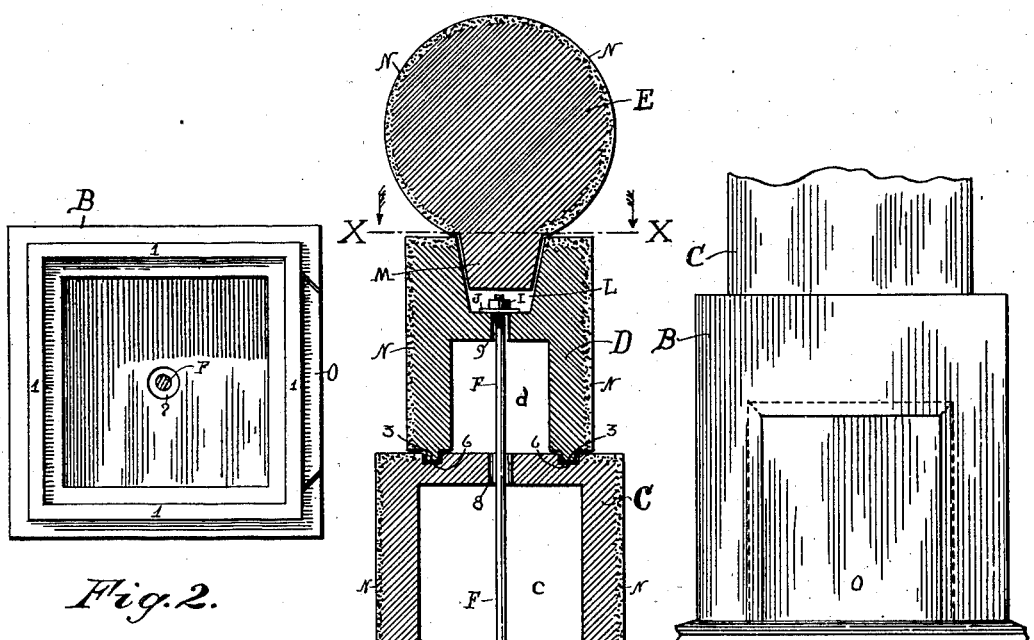
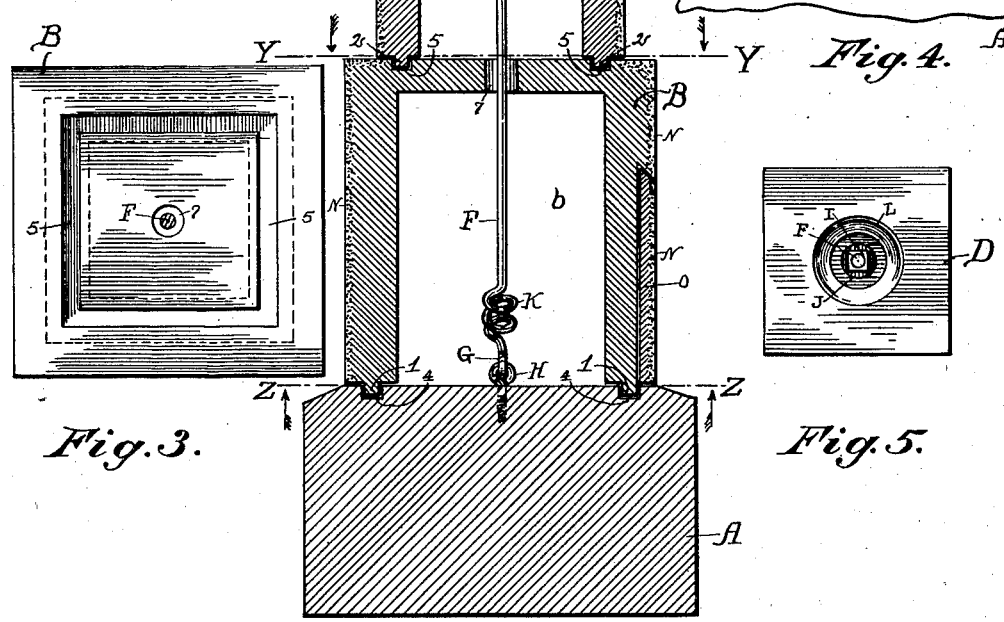
Fig. 1. Fig. 2. Fig. 3. Fig. 4. Fig. 5.
Witnesses,
S. C. Duvall.
R. E. Randle.
Inventor,
ELWOOD SCOTT;
by his attorney,
Robert W. Randle.

No. 728,993.                                                         Patented May 26, 1903.

UNITED STATES PATENT OFFICE.

ELWOOD SCOTT, OF MARION, INDIANA.

MONUMENT.

SPECIFICATION forming part of Letters Patent No. 728,993, dated May 26, 1903.

Application filed July 28, 1902. Serial No. 117,318. (No model.)

*To all whom it may concern:*

Be it known that I, ELWOOD SCOTT, a citizen of the United States, residing in Marion, in the county of Grant and State of Indiana, have invented new and useful Improvements in Monuments; and I do hereby declare the following to be a full, clear, and exact description of the invention, such as will enable others skilled in the art to which it appertains to make and use the same.

The invention relates to monuments designed especially to be formed of glass or the like and the details of construction as herein set forth and shown.

The invention has for its object the provision of a monument composed of glass or the like whereby the several parts thereof may be molded or shaped as desired while the material of which it is formed is in a plastic state.

Another object is to provide a monument of glass or the like and to supply to the surface thereof the appearance of marble or other stone or of other material.

Another object is to provide a monument of glass or the like and means whereby the surface thereof will be capable of receiving and maintaining a high polish which may have the appearance of some material other than that of which it is composed.

Another object is the provision of a monument or the like composed of glass or other material formed of sections placed one above the other, means for securely attaching the sections together, means for securely connecting and locking an epitaph or name plate thereto, and means whereby the monument or the like may be secured to a suitable base composed of the same or of other material.

Another object is the provision of a monument or the like composed of glass or other material formed into one or more sections to be secured to each other and to a base.

Another object is to provide hollow blocks formed of glass or the like and means for giving the surface of the blocks thus formed a facing of sand or the like permanently embedded therein.

Another object is to provide a monument or the like which will be simple in character, composed of a minimum amount of material, in which the parts may easily and quickly be assembled, which will when set up and adjusted be a work of art, which will be practically non-destructible, and which will effectually withstand the ravages of storm and weather; and another object is the provision of a new article of manufacture, a monument formed of glass or the like provided with a facing of sand or other material embedded in its surface, which can be manufactured and sold at a comparatively low price.

Other objects and advantages of my invention will appear from the following specification and from the drawings forming a part thereof. The invention also consists of other features and details of construction, which are specifically set forth in the claims hereunto appended.

My improvements herein set forth render the production of hollow smooth-surfaced monuments or the like practical, solving many of the most serious problems that have stood in the way of the practical attainment of that end and of the attainment of the objects above stated.

In detail the invention consists of monuments or the like constructed, preferably, in the manner substantially as shown in the accompanying drawings, in which—

Figure 1 shows a central longitudinal section of a monument constructed in accordance with my invention. Fig. 2 is a plan view of the under face of a section of a monument constructed in accordance with my invention, taken on the line Z Z in the direction of the arrows. Fig. 3 is a plan view of the upper face of a section of a monument constructed in accordance with my invention, taken on the line Y Y in the direction of the arrows. Fig. 4 is a detail of the front face of a section of a monument constructed in accordance with my invention, showing the face of the epitaph or name-plate secured thereto. Fig. 5 is a plan view of the upper face of the top section of a monument, the capital being removed, constructed in accordance with my invention, taken on the line X X in the direction of the arrows.

Similar indices refer to similar parts throughout the several views.

In detail, A represents the base.

B represents a section diametrically smaller than the base A.

C represents a section similar to and diametrically smaller than the section B.

D represents a section diametrically smaller than the section C, and E represents the capital secured on the top of the section D.

The sections B, C, and D are preferably formed with hollow cavities $b$, $c$, and $d$ therein, the contour of which conform to the contour of the outer surface of the respective sections B, C, and D.

Extending all around on the lower face of the sections B, C, and D, near the outer edges thereof, are the tongues 1, 2, and 3, respectively, which tongues are adapted to fit into the respective grooves 4, 5, and 6, which extend all around the upper face of the section below.

Through each of the sections I provide the respective central vertical openings 7, 8, and 9, through which openings pass the rod F. The upper end of the rod F is threaded, and the lower end is provided with a hook G, adapted to be engaged in the eye of the screw H.

I represents a nut threaded to the upper end of the rod F, and J represents a washer for said nut.

In one portion of the rod F is formed one or more coils therein, thus forming a resilient helical spring K, adapted to equalize the contraction and expansion of the materials.

In the center of the upper face of the section D is formed a circular downwardly-tapering cavity L, and on one portion of the capital E is provided a circular tapering protuberance M, said protuberance being adapted to fit the cavity L, substantially as shown.

The exterior exposed surface of all the sections and of the capital is covered with sand, crushed stone, or the like, (represented by N.) This I find can be accomplished by working the sand or the like into the surface of the block while it is in a plastic state, thus permanently embedding the sand or the like in the surface of the section. After the sections have become hardened the sanded surface may be smoothed and polished, if desired, and finished in its natural color, or, if desired, they may be stained or colored in any well-known manner. If preferred, the surface of the sections, if made of glass, may be made pellucid, semipellucid, opaque, or colored to the desired shade without the facing of sand.

In one or more of the sections I provide a name-plate, (represented by indice O,) which may be secured in the face of the section, as shown, which consists in forming into the face of the section a trifurcated indentation of a size just sufficient to receive the name-plate O, which I insert therein from the bottom of the section, by which the plate is held in place in connection with the projecting chimes.

In practice I prefer to form the base A of stone or metal, while the several sections and the capital I prefer to form of glass treated in the manner above stated and the several parts secured together substantially as shown, which consists of first preparing the base A with a groove 4 around its surface to receive a tongue 1. I also secure the screw-eye H in the center of the stone A, as shown. I then secure the hook G in the eye H. I then place the sections B, C, and D in position, as shown, allowing the rod F to pass through the holes 7, 8, and 9. I then place the washer J over the end of the rod F, allowing it to rest around and over the opening 9, as shown, and then attach the nut I and screw it down tightly, which will bind the sections together and to the base. I now insert the protuberance M of the capital E in the cavity L, where it may be embedded in cement or the like to exclude moisture. The tongues 1, 2, and 3 may also be embedded in cement, as may also the name-plate O.

From the above description, taken in connection with the accompanying drawings, it will be seen that I have produced an improved construction for monuments or the like embodying the objects elsewhere referred to in this specification.

While I have illustrated and described the best means now known to me for carrying out my invention, I wish it to be understood that I do not restrict myself to the exact details of construction shown and described, but hold that any changes or variations in such details as would suggest themselves to the ordinary mechanic would clearly fall within the limit and scope of my invention, and I wish it understood that I do not dedicate any part of my invention to the public, but that I wish adequate and just protection for every feature of the invention and the various details thereof herein shown and described that are new and useful and which involve invention.

Having now shown and described my invention and the best mode for its construction to me known at this time, what I claim as new, and desire to secure by Letters Patent of the United States, is—

1. The herein-described construction for monuments or the like, consisting of a base provided with a screw-eye in the center of its face; a groove cut into the face of the base surrounding said screw-eye; one or more sections provided with tongues extending down from the lower face thereof and grooves cut in the upper faces thereof, the tongues being adapted to fit into the grooves of the section below; each of the sections being hollow, said hollow spaces extending through the under face of the section; central longitudinal holes through each of the sections; a rod adapted to pass through said holes, the lower end of the rod being hooked into the eye of the base, the upper end of the rod secured by a nut engaging the upper section; the downwardly-tapering cavity formed in the upper section, the capital secured on the upper section and the circular tapering protuberance projecting from the capital adapted to fit in said cavity, all substantially as shown and described and for the purposes set forth.

2. The herein-described construction for monuments or the like, consisting of a base provided with a screw-eye in the center of its face, a groove formed in the face of the base surrounding said screw-eye, one or more sections provided with tongues extending down from the lower face thereof and grooves formed in the upper faces thereof, the tongues being adapted to fit into the grooves of the section below, each of the sections being hollow, said hollow spaces extending through the under surface of the section, central longitudinal holes formed through each of the sections, a rod adapted to pass through said holes, the lower end of said rod being hooked into the eye secured in the center of the base, the upper end of said rod being secured by a nut engaging the upper section, the downwardly-tapering cavity formed in the upper section, the capital secured on the upper section by a circular tapering protuberance projecting down from the capital into said tapering cavity in the upper section, and a coating of sand or the like embedded into the exposed portions of the sections, all substantially as shown and described.

In testimony whereof I have hereunto signed my name in the presence of two subscribing witnesses.

ELWOOD SCOTT.

Witnesses:
W. A. MILLS,
A. N. WIMPY.